(12) United States Patent
Kaliszek et al.

(10) Patent No.: US 7,684,659 B1
(45) Date of Patent: Mar. 23, 2010

(54) BIFILAR OPTICAL FIBER STOWAGE FOR FIBER-OPTIC GYROSCOPE

(75) Inventors: Andrew W. Kaliszek, Phoenix, AZ (US); Derek Mead, Scottsdale, AZ (US); Brian P. Timmons, Phoenix, AZ (US); Stanislaw Kopacz, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/251,060

(22) Filed: Oct. 14, 2008

(51) Int. Cl.
*G02B 6/00* (2006.01)
*G02B 6/04* (2006.01)
*G01C 19/72* (2006.01)

(52) U.S. Cl. .................. 385/12; 385/115; 356/465
(58) Field of Classification Search .......... None
See application file for complete search history.

(56) References Cited

U.S. PATENT DOCUMENTS

| | | | |
|---|---|---|---|
| 5,973,783 A * | 10/1999 | Goldner et al. | 356/465 |
| 6,529,444 B2 | 3/2003 | Vakoc | |
| 6,685,128 B2 * | 2/2004 | Healy | 242/445 |
| 7,372,574 B2 | 5/2008 | Sanders et al. | |
| 2007/0201030 A1 | 8/2007 | Sanders | |

* cited by examiner

*Primary Examiner*—Omar Rojas
(74) *Attorney, Agent, or Firm*—Fogg & Powers LLC

(57) ABSTRACT

A method of constructing a fiber-optic gyroscope includes optically coupling first and second optical fibers to an optical path of an interferometer having an outer surface, coupling at least a portion of the first and second fibers to the outer surface, and optically coupling the first and second fibers to an optical path of an integrated optics chip (IOC).

14 Claims, 4 Drawing Sheets

BIFILAR OPTICAL FIBER STOWAGE FOR FIBER-OPTIC GYROSCOPE

BACKGROUND OF THE INVENTION

Fiber optic gyroscopes (FOGs) have become widely used technologies in many systems to sense the rotation and angular orientation of various objects, such as aerospace vehicles. FOGs work by directing light in opposite directions around a closed optical path enclosing an area whose normal is along an axis of rotation. If the device is rotated about the axis of rotation, the optical path length for the light traveling in one direction will be reduced, while the optical path length for the light traveling in the opposite direction will be increased. The change in path length causes a phase shift between the two light waves that is proportional to the rate of rotation.

Referring to FIG. 1, a typical FOG 10 includes a light source 15, a rate detector 20, a coupler 25, an integrated optics chip (IOC) 30, and an interferometer, such as a sensing coil 35. As shown in FIG. 1, a red fiber service lead 40 and blue fiber service lead 45 of the IOC 30 is spliced 50, 55 to the red fiber service lead 60 and blue fiber service lead 65 of the fiber coil interferometer 35. Each of these service leads are often approximately two meters in length to allow optical splicing needed in the build process. Since these fiber service leads for splicing are functionally part of the interferometer 35, the manner in which the service leads are stowed is a key gyroscope performance parameter.

In conventional FOG builds, these lead fibers are stowed in a thread-like winding pattern in a holding compartment having independent thermal characteristics from the interferometer 35. Specifically, in such an approach, waves counter-propagating through the coil 35 may "see" different environment effects at different points in time. High-performance polarization maintaining gyroscopes must have Lorentz reciprocity between the counter-propagating waves. Lorentz reciprocity requires light propagating in a medium to have identical effects independent of the direction of light propagation. Environmental effects can easily degrade Lorentz reciprocity and gyroscope performance. As such, these conventional approaches typically have degraded Lorentz reciprocity caused by environmental effects.

SUMMARY OF THE INVENTION

In an embodiment, a method of constructing a fiber-optic gyroscope includes optically coupling first and second optical fibers to an optical path of an interferometer having an outer surface, coupling at least a portion of the first and second fibers to the outer surface, and optically coupling the first and second fibers to an optical path of an integrated optics chip (IOC).

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An embodiment provides for a service-lead stowage location on the outer layer of an interferometric fiber coil, thereby providing improved performance as compared to a separate compartment storage.

An embodiment of a bifilar service-lead routing method provides improved performance under time-varying thermal gradients and reduces the Shupe effect of these service leads.

An embodiment provides bifilar fiber routing method that ensures service leads are confined to a single outer layer of a coil and not additional layers, which would be subject to more stress over temperature changes.

An embodiment provides a reduction of the number of points where optical fiber crosses over itself, as well as twists in the fiber, thereby improving gyroscope bias stability.

By routing the fibers in such a bifilar-pair fashion, points equal and opposite in the sensing loop are physically adjacent to each other and see the same effects over varying environments.

Figure 1:
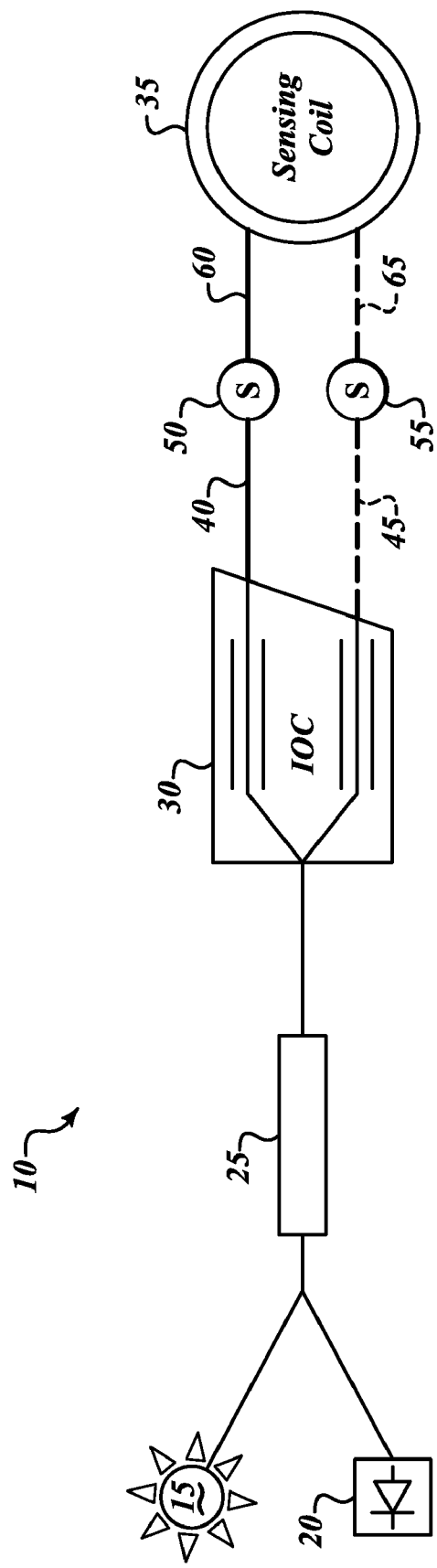
FIG. 1 is a schematic view of a conventional FOG in which embodiments of the present invention may be implement.
Figure 2:
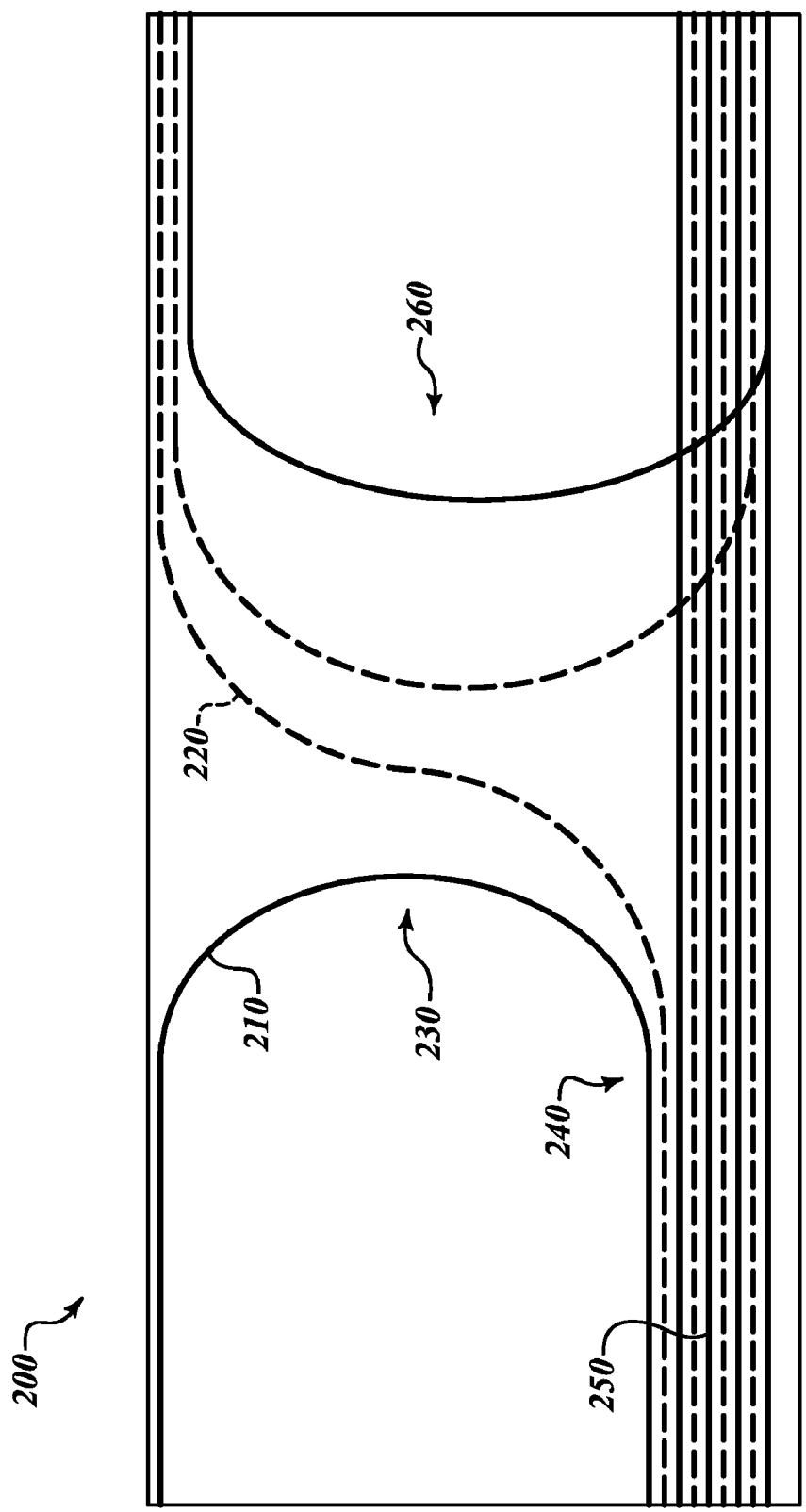
FIG. 2 is a front plan view of service lead routing according to an embodiment of the invention.

Referring now to FIG. 2, illustrated is a front view of the outer surface of an interferometer 200 along which are routed, according to an embodiment, a red service lead fiber 210 (illustrated in FIG. 2 as a solid fiber element) and a blue service lead fiber 220 (illustrated in FIG. 2 as a cross-hatched fiber element) connecting an optical path of the interferometer 200 to the optical path of an IOC (not shown).

In an embodiment of the invention, a first portion of the red fiber 210 directly coupled to the optical path of the interferometer 200 is seen emerging from the center of the interferometer and is oriented along a left-to-right path along the outer surface. Similarly, a first portion of the blue fiber 220 directly coupled to the optical path of the interferometer 200 is seen emerging from the center of the interferometer and is oriented along a right-to-left path along the outer surface. As such, a second portion of the red fiber 210 and a second portion of the blue fiber 220 converge toward one another so as to form a "Y"-junction 230.

Figure 4:
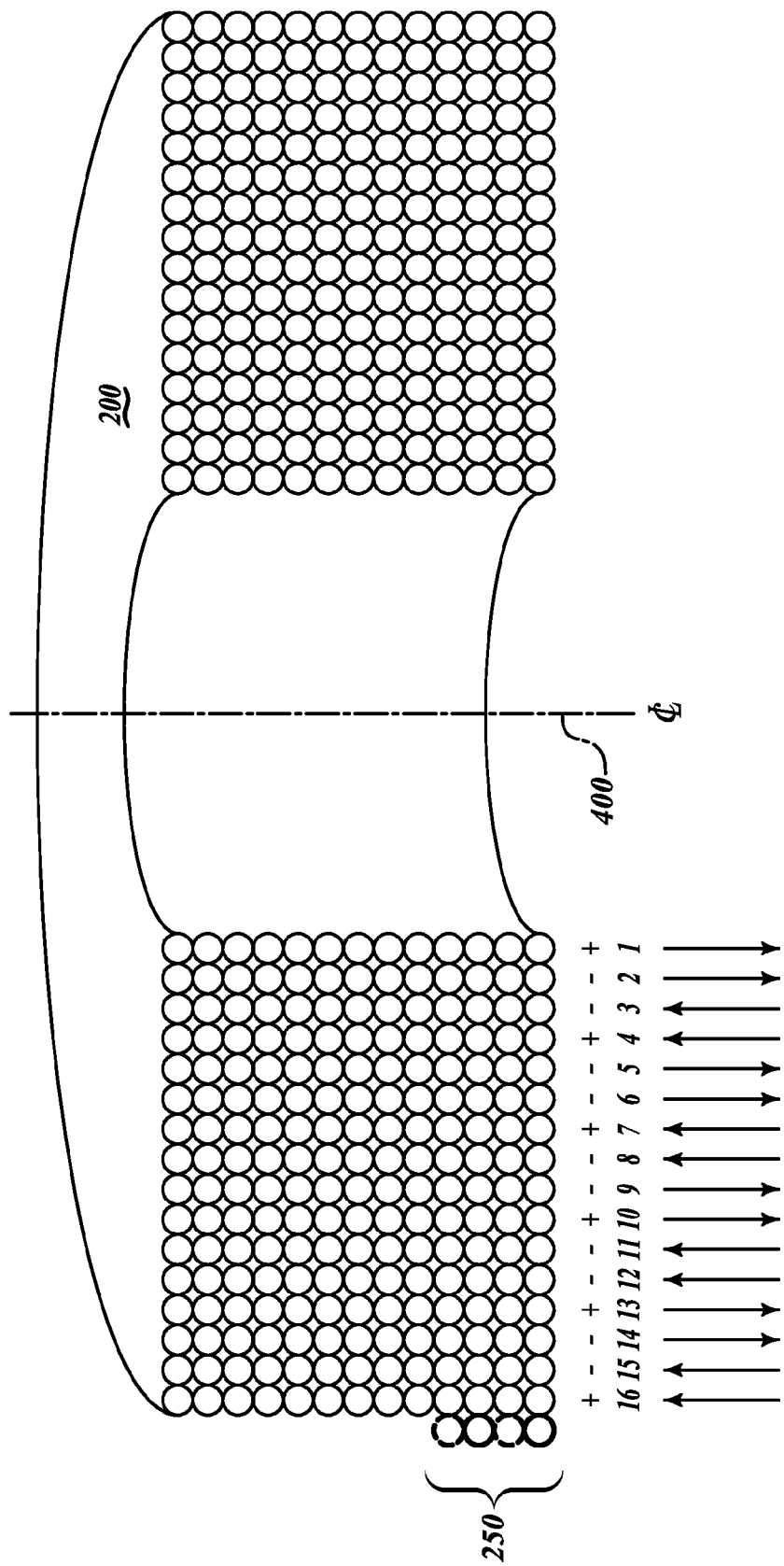
FIG. 4 is a top perspective cross-sectional view of an interferometer with service lead routing according to an embodiment of the invention.

Subsequently, beginning at a region 240 of the outer surface, multiple turns of respective third portions of the red fiber 210 and blue fiber 220 are wrapped around the outer surface a predetermined integer number of times to form a winding 250. As best seen in FIG. 4, the winding is formed so as to form only a single layer along the outer surface of the interferometer 200 in a direction normal to a center axis 400 of the interferometer. Additionally, it should be noted that, in forming the winding 250, the red and blue fibers 210, 220 do not cross or otherwise overlap each other.

After forming the winding 250, a fourth portion of the red fiber 210 and a fourth portion of the blue fiber 220 are routed up and away from the winding and in the opposite direction so as to form a "U-turn" configuration 260, or perhaps an even more rounded, "lasso" type configuration (not shown). In an embodiment, if there is a disparity in length between the red and blue fibers 210, 220, the distance between the red and blue fibers may be increased at the "U" portion of the configuration 260 to accommodate the longer fiber.

Figure 3:
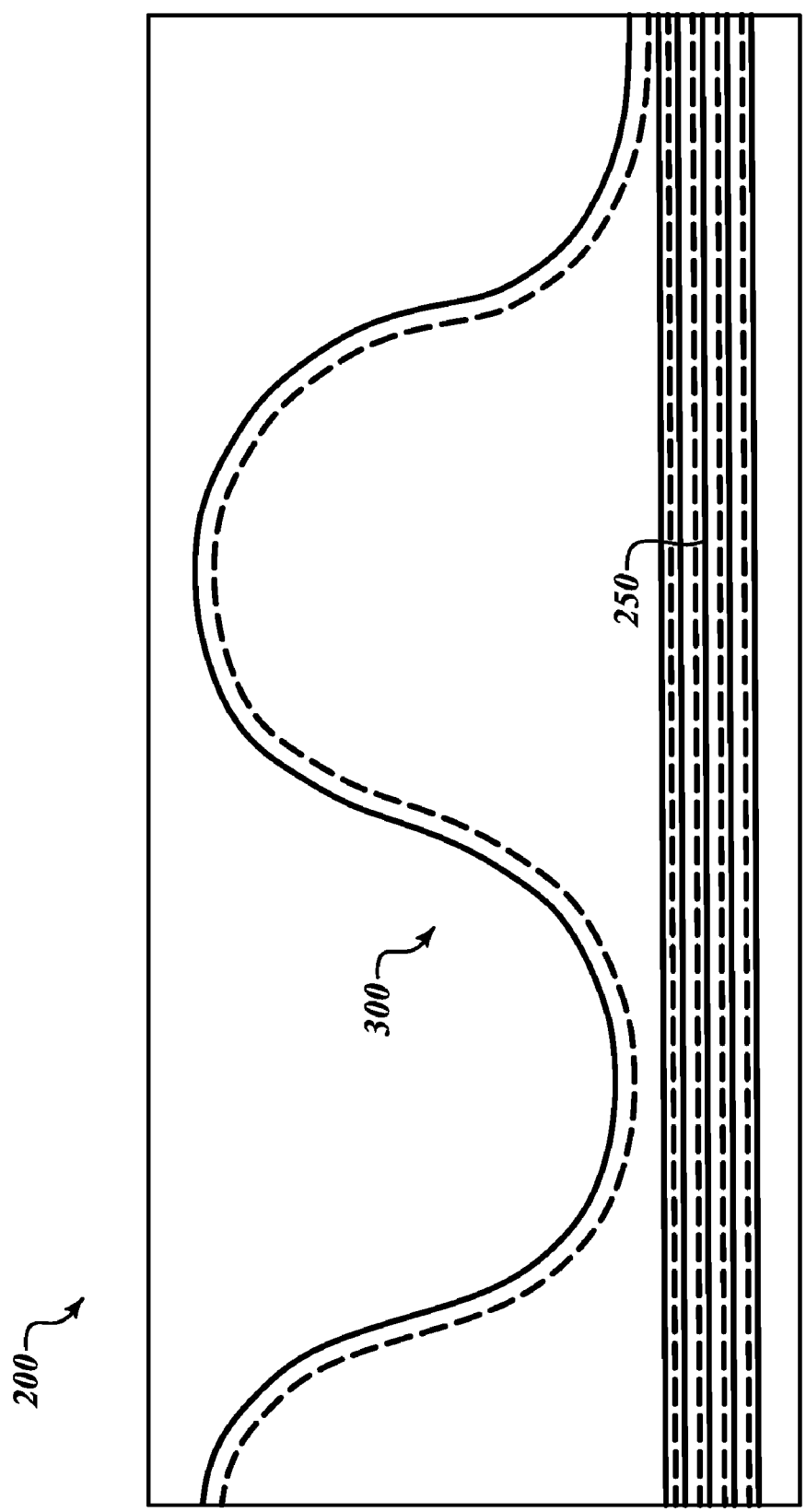
FIG. 3 is a rear plan view of service lead routing according to an embodiment of the invention.

After forming the U-turn configuration 260, as best illustrated in FIG. 3, the red and blue fibers 210, 220 are oriented in a substantially sinusoidal, or serpentine, configuration 300 along the outer surface, also in the direction opposite of the direction in which the winding 250 was formed. The red and blue fibers 210, 220 may then be subsequently coupled to the optical path of the IOC.

In an embodiment, the red and blue fibers 210, 220 are coupled to the outer surface of the interferometer 200 in a manner that reduces or eliminates light cross-coupling.

It should be further noted that the only time the red and blue fibers 210, 220 cross each other or otherwise overlap is at the points of transition from the winding 250 to the "U-turn" configuration 260 as illustrated in the example of FIG. 2.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of constructing a fiber-optic gyroscope, the method comprising:
    optically coupling first and second optical fibers to an optical path of an interferometer having an outer surface;
    coupling at least a portion of the first and second fibers to the outer surface; and
    optically coupling the first and second fibers to an optical path of an integrated optics chip (IOC);
    wherein coupling at least a portion of the first and second fibers to the outer surface comprises:
    orienting a first portion of the first fiber in a first direction relative to the outer surface;
    orienting a first portion of the second fiber in a second direction relative to the outer surface and different from the first direction;
    orienting a second portion of the first fiber and a second portion of the second fiber such that the second portions of the first and second fibers converge toward one another;
    wrapping multiple turns of respective third portions of the first and second fibers around the outer surface in the same direction;
    looping a fourth portion of the first fiber and a fourth portion of the second fiber to be oriented in a direction opposite to the direction of the respective third portions; and
    orienting a respective fifth portion of the first and second fibers in a substantially sinusoidal configuration along the outer surface.

2. The method of claim 1 wherein the first direction is the opposite of the second direction.

3. The method of claim 1 wherein orienting a second portion of the first fiber and a second portion of the second fiber such that the second portions of the first and second fibers converge toward one another comprises orienting the second portion of the first fiber and the second portion of the second fiber such that the second fiber portions do not overlap one another.

4. The method of claim 1 wherein wrapping multiple turns of the respective third portions of the first and second fibers around the outer surface comprises wrapping multiple turns of the respective third portions of the first and second fibers around the outer surface without overlapping the first and second portions of the first and second fibers.

5. A fiber-optic gyroscope, comprising:
    an interferometer having an optical path and an outer surface;
    an integrated optics chip (IOC) having an optical path; and
    first and second optical fibers, at least a portion of the first and second fibers being coupled the to the outer surface, the first and second fibers being optically coupled to the optical paths of the interferometer and IOC;
    wherein the first and second fibers are coupled to the outer surface such that:
    a first portion of the first fiber is oriented in a first direction relative to the outer surface;
    a first portion of the second fiber is oriented in a second direction relative to the outer surface and different from the first direction;
    a second portion of the first fiber and a second portion of the second fiber are oriented such that the second portions of the first and second fibers converge toward one another;
    multiple turns of respective third portions of the first and second fibers are wrapped around the outer surface in the same direction;
    a fourth portion of the first fiber and a fourth portion of the second fiber are looped to be oriented in a direction opposite to the direction of the respective third portions; and
    a fifth portion of the first fiber and a fifth portion of the second fibers are oriented in a substantially sinusoidal configuration along the outer surface.

6. The gyroscope of claim 5 wherein the first direction is the opposite of the second direction.

7. The gyroscope of claim 5 wherein the second portions of the first and second fibers do not overlap one another.

8. The gyroscope of claim 5 wherein the multiple turns of the respective third portions of the first and second fibers are wrapped around the outer surface without overlapping the first and second portions of the first and second fibers.

9. The method of claim 1, wherein coupling at least a portion of the first and second fibers to the outer surface comprises coupling at least a portion of the first and second fibers to the outer surface in a single layer.

10. The method of claim 1, wherein looping the respective fourth portion of the first and second fibers comprises looping the respective fourth portions over the top of the multiple turns of the third portions.

11. The method of claim 10, wherein the respective fourth portions are looped over the top of the multiple turns of the third portions such that there is a single cross-over point for each of the multiple turns.

12. The gyroscope of claim 5, wherein the first and second fibers are coupled to the outer surface in a single layer.

13. The gyroscope of claim 5, wherein the respective fourth portions of the first and second fibers are looped over the top of the multiple turns of the third portions.

14. The gyroscope of claim 13, wherein the respective fourth portions are looped over the top of the multiple turns of the third portions such that there is a single cross-over point for each of the multiple turns.

* * * * *